April 4, 1961     F. O. BRISLEY ET AL     2,978,529
BATTERY SEPARATOR AND METHOD FOR MANUFACTURING SAME
Filed Oct. 17, 1955
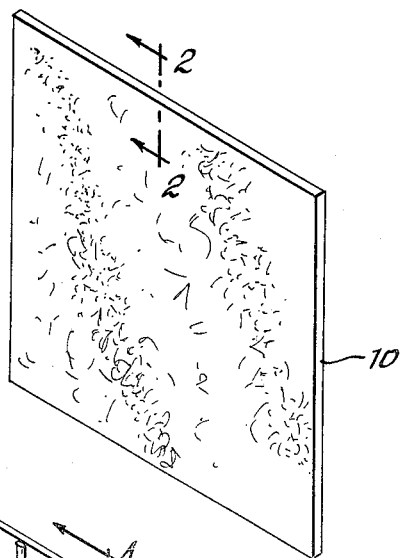
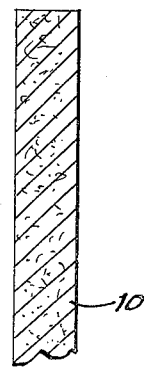
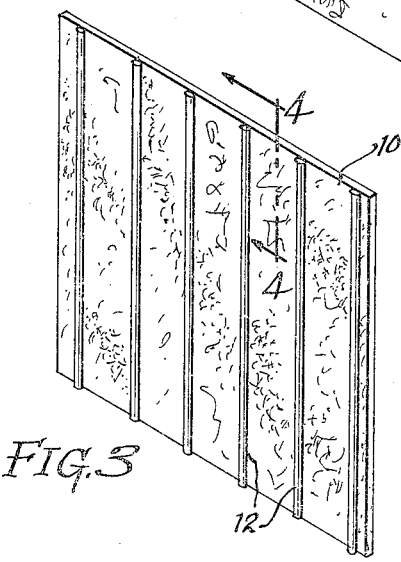
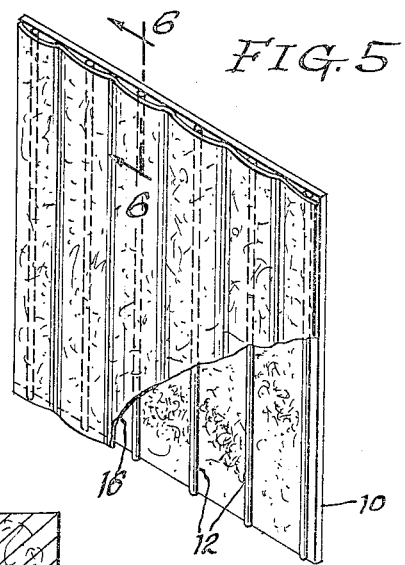
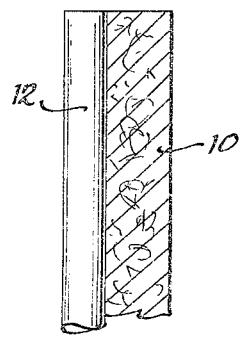
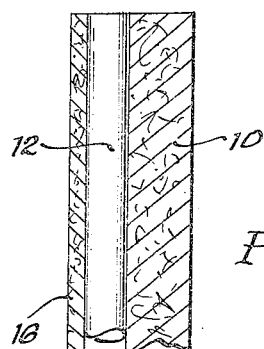
INVENTOR.
Frank O. Brisley
Robert E. Evans
By Staelin and Overman
Attorneys

United States Patent Office 2,978,529
Patented Apr. 4, 1961

2,978,529

BATTERY SEPARATOR AND METHOD FOR MANUFACTURING SAME

Frank O. Brisley and Robert E. Evans, Newark, Ohio, assignors to Owens-Corning Fiberglas Corporation, a corporation of Delaware Filed Oct. 17, 1955, Ser. No. 540,931

10 Claims. (Cl. 136—145)

This invention relates to a separator for use between the positive and negative plates of an electrolytic cell such as employed in a wet or dry cell storage battery.

The ordinary storage battery is constructed of one or more of such electrolytic cells in which the positive plates, interconnected one with the other, and the negative plates, similarly interconnected, are interleaved to arrange the plates in closely spaced apart parallel relation. In a wet cell battery, a paste of active material is bonded to the surfaces of the lead-antimony plates which are immersed in an electrolyte, such as dilute sulphuric acid.

One of the important factors which influences the utility and life of an electrolytic cell is the ability electrically to insulate the positive and negative plates one from the other in the cell. The useful life of an electrolytic cell is terminated when a conductive contact is established between a positive and negative plate. Contact can occur from a number of causes arising during normal use of a battery. Frequently, during charge or discharge of the cell, one or both of the plates may buckle to the extent that actual plate-to-plate contact is established. In other instances, metal deposits or a deposit of active material may build up on the walls of one or the other or both of the plates by inadvertent depositions in amounts sufficient to bridge the space between the plates. This is generally referred to in the art as "treeing." The commonest device used to cope with these problems of electrical short circuit is the use of a separator between the plates to function as a barrier to the build-up of deposits, to maintain a spaced relation between the plates and minimize buckling or the effect of buckling and to electrically insulate the plates one from the other.

The specifications for a separator have been established from experience and tests based upon extensive uses in various types of electrolytic cells. One of the more important requirements is the need for good electrical insulation characteristics; it should have sufficient mass integrity and strength to resist deterioration in manufacture and assembly and to carry itself between the plates for holding the plates in the desired spaced relation; it should be formed of materials capable of resisting attack by the chemicals present in the electrolyte; it should not contaminate the electrolyte or interfere with the reactions for current generation; it should not carry on side reactions with sections of the plates to cause or accelerate decompositions or else prevent full utilization of the plate for generation of electrical current; it should be sufficiently porous to permit circulation of the electrolyte whereby improved performance is secured by raising the capacity of the plate at a given discharge rate and to permit the rise of any generated gases, and finally it should prevent passage of materials, such as is often referred to in the art as "mud" which causes treeing.

While many materials have been proposed for use as separators, none satisfactorily meet all of these requirements. To the present, extensive use has been made of separators formed of wood, such as Port Oxford cedar, but its electrical characteristics leave much to be desired and it is necessary to maintain the wooden separators moistened once they have been immersed into the electrolyte.

Use has also been made of natural or synthetic rubbers in the form of microporous sheets, with or without fibrous reinforcements. Although the microporous ebonite type separators appear to be better than wooden separators in many respects, they are deficient in others including electrical resistance and their cost is excessive when compared with wooden separators or separators such as are produced for use in accordance with the practice of this invention.

It is an object of this invention to produce and to provide a method for producing a battery separator capable of manufacture of low cost and readily available materials, which has high wet and dry strength, which can be used in either wet or dry storage batteries, which has low electrical resistance, especially at high and low temperatures, which is resistant to attack by battery acids and resistant to oxidation under conditions of use especially at high temperatures, which prevents treeing or the build-up of depositions on the surfaces thereof and in the interior of the separator, which permits the free passage of electrolyte through and around the separator, which is dimensionally stable and which has long life under conditions of use to prevent electrical short circuit between the plates of the battery and which is dimensionally stable and strong to permit efficient manufacture and use thereof in the assembly of the battery.

Separators which have heretofore been employed are not only deficient in one or more of these respects but they are also incapable of meeting many of the demands for present day use and it is therefore a further object of this invention to produce and to provide a method for producing a new and improved battery separator which has the additional properties of increased void volume and high porosity, improved cold rate performance both in minutes and voltage at 0° and —20° F., which has high ionic flow and high acid diffusion, and which provides for rapid acid wetting, high acid sorption, and rapid acid rewetting.

These and other objects and advantages of this invention will hereinafter appear and for purposes of illustration, but not of limitation, embodiments of the invention are shown in the accompanying drawing in which:

Figure 1 is a perspective elevational view of a battery separator embodying the features of this invention;

Figure 2 is a sectional view taken along the line 2—2 of Figure 1;

Figure 3 is a perspective elevational view of the battery separator of Figure 1 with rib members formed in one face thereof;

Figure 4 is a sectional view taken along the line 4—4 of Figure 3;

Figure 5 is a perspective elevational view of a double insulation product in the form of a battery separator corresponding to that shown in Figure 3 with a bonded mat covering the ribbed portion; and Figure 6 is a sectional view taken along the line 6—6 of Figure 5.

A markedly improved separator capable of supplying characteristics corresponding to the objects of this invention has been fabricated by the use of glass fibers in combination with a minimum amount of resinous binder for imparting strength and rigidity to the formed structure. When glass fibers are used alone in the preferred practice of this invention, it is most desirable to make use of a rather coarse fiber (9 microns) and a substantial proportion of extremely fine glass fibers of small diameter (less than 3 microns and preferably less than 1 micron down to about 0.1 of a micron in diameter) which functions as a blocking agent by decreasing porosity and as a bonding agent to impart wet strength to the interfelted fibers and to hold the interfelted fibers as a self-sufficient mass for treatment in application of the resinous binder. The combination of fine glass fibers interfelted with other glass fibers of the same or larger diameters requires the use of considerably less resinous binder than heretofore required for other fibrous structures of the cellulose type with the result that a structure of satisfactory strength and good insulation characteristics is secured in a separator of less thickness and greater porosity thereby to improve the separator in many of the described characteristics.

The improvement in battery separators fabricated to embody the features of this invention as compared to the separators heretofore employed can be illustrated by the improvement in such important characteristics as electrical resistance or by the results in the 5-second voltage test for the completed cell or battery. As compared to electrical resistance values of 0.00083 ohm/sq. in./mill for Port Oxford cedar or a value of 0.00132 ohm/sq. in./mill for microporous rubber separators, a glass fiber separator fabricated in accordance with the practice of this invention of 90 percent by weight glass fibers of about 9 microns in diameter and 10 percent by weight of glass fibers of ½ micron in diameter bonded with about 15 percent by weight of polystyrene resin has an electrical resistance value of about 0.000428 ohm/sq. in./mill. This is about one-half the value for the Port Oxford cedar and about one-third the value for separators formed of microporous ebonite. In the 5-second voltage test which measures the voltage on the plate after 5 seconds of rapid discharge at 300 amps., simulating starting operation for an automotive vehicle, the plates formed of Port Oxford cedar or microporous rubber have 4.5 volts available whereas a voltage of at least 4.65 is available from plates making use of separators embodying the features of this invention.

In addition, the electrical resistance values which are extremely low at the start do not decrease appreciably after a 40-hour soak. For example, the value of 0.000428 ohm/sq. in./mill after a 20-minute soak was only 0.00414 ohm/sq. in./mill after a 24-hour soak of the separator. Another noticeable improvement in practical application is to be found in the high water absorption of 94.5 percent which indicates very rapid and complete wetting of the glass fibers of the separator.

Fibrous materials have been employed in the past in the manufacture of battery separators. In the main, such usage of fibrous materials has been limited to cellulose fibers bonded with substantial amounts of synthetic resinous binder (over 20-25 percent) for protection of the fibers from attack by the battery acids and for holding the fibers together to form a rigid separator plate. To a limited extent, use has been made of glass fibers in the manufacture of battery separators but only as a substitute in part for the cellulose fibers for purposes of strengthening the plate. This is to be distinguished from the use of glass fibers as a complete replacement for cellulose materials. Such separators which have been formed of combinations of cellulose and glass fibers have remained subject to many of the limitations of separators formed of cellulose fibers alone, especially from the standpoint of electrical resistance and the amount of resinous material required for protection of the cellulose fibers.

For example, description is made in the Merrill Patent No. 2,687,445, issued August 24, 1954, of a battery separator in which use is made of glass fibers in amounts of about 50 percent in combination with an equal amount of kraft pulp to form a felt which is subsequently impregnated with a synthetic acid resistant thermosetting resin and carefully cured under controlled temperature conditions to prevent migration of the resin from one section to another during cure.

In the Booth Patent No. 2,673,887, issued March 20, 1954, description is made of a battery separator in which the amount of glass fibers employed in combination with pulp fibers is increased to a ratio of about 50-70 parts by weight of glass fibers to 44-24 parts by weight of pulp fibers in combination with resinous binder which is cured as the formed mat is pressed to remove excess binder to form ribs in the structure.

While best results, from the standpoint of electrical resistance and other of the improvements previously described, are secured by the use of fine glass fibers alone or in combination with coarser glass fibers, it has been found that the fine glass fibers may be substituted at least in part by cellulose pulp fibers but that the amount of cellulose pulp fibers should not exceed 20 percent by weight of the fibrous components, otherwise the separator will take on the inferior characteristics of the cellulose type separators or other separators heretofore employed. The separator will have considerably poorer electrical resistance and the void volume and porosity will be decreased to the point of interference with the desired free flow of the electrolyte. When the amount of cellulose pulp fibers are kept below 20 percent by weight of the fibrous component, the electrical resistance characteristics, while poorer than the all glass fiber separator, will still represent a marked improvement over separators of the type heretofore manufactured of cellulose pulp fibers alone or substituted by glass fibers in amounts up to as much as 70 percent by weight.

As used herein, the term "glass fibers" is meant to include staple glass fibers formed by the attenuation of molten streams of glass by high pressure streams of air or steam directed angularly downwardly onto the molten streams of glass as they issue continuously from the openings at the base of a glass melting bushing. Included also are the group of fibers generally referred to as the continuous or textile fibers wherein molten streams of glass are mechanically drawn at high speed into endless lengths. These as well as the staple fibers may be gathered into endless bundles or strands and twisted or intertwisted into yarns and these strands or yarns may be cut or otherwise chopped into shorter lengths for use as the glass fibrous component in the manufacture of battery separators embodying the features of this invention. The term "glass fibers" is intended also to include the more recently developed rotary process fibers wherein primary fibers are formed by action of centrifugal force to attenuate streams of molten glass from a spinner having a plurality of orifices at its periphery after which the primary fibers are further attenuated by a blast from one or more burners.

While each process produces fibers that differ somewhat from each other in characteristics and in dimension, it will be found that there is some overlap, at least in the dimensional characteristics of the fibers because variations will develop in accordance with the conditions employed in manufacture. In general, the wool process used to produce fibers for use in the manufacture of glass wool, glass insulation, glass mats and bonded or molded glass insulation products produces fibers which range from 10 microns to 100 microns in diameter. Continuous fibers drawn directly from molten streams of glass will usually be found to have a diameter ranging from 5 microns to 35 microns. The finest glass fibers are provided by the flame-blown or superfine process wherein fibers of less than 0.75 micron in diameter and up to 3-5 microns in diameter can be produced.

In the practice of this invention it is essential to make use of glass fibers which are formed of a composition that is resistant to attack by the battery acids and which is resistant to oxidation and enjoys good electrical insulation characteristics. The essential characteristics are available in many of the glass fibers which are commercially produced including the glass fiber compositions used for the manufacture of steam blown or gas blown wool and the compositions used in the rotary process for the manufacture of fibers of small diameters.

In the all glass fiber system, at least 5 percent of the fibrous components should comprise glass fibers having a diameter of less than 3 microns and preferably having a diameter of 1 micron or less down to about 0.1 micron. The separator may be formed entirely of such fine glass fibers but it is preferred to make use of a mixture of such fine glass fibers with coarse fibers of more than 5 microns in diameter up to about 16 microns in diameter. In the broad sense, use can be made of glass fibers of 0.1 to 5 microns in amounts ranging from 5–100 percent by weight in combination with coarse glass fibers up to 16 microns in diameter in amounts ranging from 0–95 percent by weight. In the preferred concept, the fibrous materials may be present in the ratio of 10–25 percent by weight of fine glass fibers of ¼–3 microns with 75–90 percent by weight of glass fibers greater than 5 microns in diameter.

The term "pulp fibers" is meant to include kraft pulp fibers, sulphite pulp fibers, cellulose pulp fibers which include such fibers as cotton linters, alpha-cellulose and the like. When present, the pulp fibers assist the glass fibers in preventing treeing and electrical short circuits but the electrical resistance of the separator is undesirably affected by the presence of such pulp fibers as is the acid resistance and the oxidation resistance of the separator. Thus it is important in the practice of this invention to keep the amount of pulp fibers to a minimum. While the electrical resistance and oxidation resistance are undesirably affected by the combination to use pulp fibers with the glass fibers, a marked differential is not secured until the amount of pulp fibers exceeds 20 percent by weight of the fibrous components.

It is important further in the fabrication of the separator plate to make use of a resinous binder which is acid resistant and resistant to oxidation and it is also desirable to make use of a resinous binder in combination with the glass fibers which is capable of developing a strong bonding relationship with the glass fibers for holding the fibers together in the plate under conditions of use and which at the same time offers good electrical insulation characteristics. For this purpose, use can be made of thermosetting resinous materials represented by phenol formaldehyde and other phenolic aldehydes, heat curable condensation resinous products, furfuryl alcohol condensation reaction products and thermoplastic resinous materials such as polystyrene, butadiene-styrene copolymers, butadiene-styrene copolymer and polystyrene emulsions, plasticized polystyrene, polyacrylic and polyalkylacrylic resins such as polymethylmethacrylate, phenol formaldehyde and latex mixtures wherein the latex is formed of one or more of the aforementioned thermoplastic polymers. The resinous binders are preferably applied from aqueous compositions containing the phenol formaldehyde resins in water solution and the water insoluble resins or rubber-like materials in aqueous dispersion or in the form of a latex. Instead, the materials may be formulated for application from solvent solution.

For application, as by a flow-coat process, dip-squeeze process, spray or the like to achieve substantially complete impregnation of the formed fibrous mat, compositions containing from 10–50 percent by weight of solids may be employed, depending upon the type of binder and the form in which the binder is contained in the treating composition.

When the separator is fabricated of fine glass fibers in combination with coarse glass fibers in the absence of cellulose pulp fibers, as little as 5 percent by weight resinous binder based upon the finished separator is sufficient. The most that is required to achieve the desired rigidity, dimensional stability and bonding is 25 percent by weight resinous material although more may be employed. With this amount, the openness available from the use of glass fibers provides a desired porosity of at least 50 percent. When cellulose pulp fibers are employed in amounts less than 20 percent by weight of the fibrous components in combination with glass fibers, additional amounts of resinous material are required to protect the cellulose fibers from the battery acids. In general, an amount ranging from 10–25 percent by weight resin is employed with a maximum in the range of about 30–40 percent by weight, in the practice of this invention.

The following examples are given by way of illustration and not by way of limitation in the practice of this invention:

Example 1

Composition:
    64 percent by weight glass fibers (continuous glass fibers of about 10 microns in diameter chopped to an average of about ¼ inch in length)
    11 percent by weight highly beaten kraft pulp having a Schoper-Reigler freeness of 120–150 cc.
    24 percent by weight water soluble phenol formaldehyde resin
    1 percent by weight Aerosol OT surface active agent

*Procedure.*—The chopped glass fibers and cellulose pulp are placed in a beater with an amount of water to dilute the mixture to about 1 percent solids. The materials are processed in the beater until a dispersible fiber is obtained, usually between 5 and 10 seconds.

The furnish is then processed through a sheet mold in separated segments to provide a flat sheet which is dried in an air circulating oven at a temperature within the range of 250–400° F. or by other drying means.

The dried sheet is then saturated with the phenol formaldehyde resin in water solution at a concentration of about 10–30 percent solids. The excess binder solution is removed, as by drainage or accelerated by suction, and then the sheet is cured at a temperature of about 400° F.

It will be understood that temperatures in excess of 250° F. or even less than 175° F. may be used for drying the sheet, especially where the fibrous components are composed essentially or entirely of glass fibers. Similarly, the temperature of cure may vary from about 300–500° F., depending upon the type of fibers, the thickness of the sheet and the rate of cure.

In a large scale process, the sheet may be formed as a continuous operation, as in a paper-making machine, and then dried by other commercial means such as calender rolls, an air circulating oven or the like through which the sheet is advanced. The sheet may be cured without compression but usually it is compressed between flat platens during cure for producing a flat compressed separator plate illustrated by the numeral 10 in Figure 1 of the drawing. Instead, the sheet may be molded between platens, at least one of which is formed with longitudinally extending laterally spaced ribs permanently to form corresponding ribs in the molded sheet for enabling free circulation of gas upwardly through the electrolyte while permitting the mud to settle down into the bottom of the cell rather than to be retained as an inert material against the face of the cell.

Instead of the Aerosol OT, any commercial wetting agent or surface active agent may be employed, such as represented by Tergitol 08, Alkanol WXN, and the like. When added to the resinous binder, the wetting agent functions to improve the bonding relationship between the binder and the glass fiber surfaces and when added to the resinous binder or afterwards to the bonded sheet, the wetting agent tends to increase the rapid acid wetting, the high acid sorption, the rapid acid rewetting and high acid diffusion of the separator plate when the plate is immersed in battery acids.

The following are further examples of compositions which may be employed in the practice of this invention. In each of the examples, a wetting agent in the amount of 0.1–2.0 percent by weight is preferably employed.

*Example 2*

90 parts by weight glass wool fibers cut to lengths of about ¼ inch
10 parts by weight glass fibers 0.5 micron in diameter
10–25 percent by weight polystyrene resinous binder, based upon the total weight of the product The fibrous materials are formed into a sheet by the procedure described in Example 1 and the polystyrene is applied from an aqueous dispersion by absorption into the fibrous sheet. The sheet is dried and then compressed and set to a thickness of about 0.017 to 0.025 inch for use as a separator.

*Example 3*

90 parts by weight glass textile fibers chopped to ¼ inch lengths
10 parts by weight beaten kraft pulp
10–40 percent by weight resinous material, based upon the total weight of the product

*Example 4*

80 parts by weight glass fibers 9 microns in diameter and chopped to lengths of ⅛ to 1 inch
10 parts by weight glass fibers 1 micron in diameter
10 parts by weight glassine pulp
10–40 percent by weight resinous binder, based upon the total weight of the product

*Example 5*

80 parts by weight coarse glass fibers ranging up to 40 microns in diameter
10 parts by weight fine glass fibers of ¼ to 3 microns in diameter
10 parts by weight alpha-cellulose
10–25 percent by weight resinous binder, based upon the total weight of the product

*Example 6*

70 parts by weight glass fibers chopped to ¼ to ½ inch in length and 9 microns in diameter
25 parts by weight glass fibers of the rotary type of about 3 microns in diameter
5 parts by weight alpha-cellulose
10–25 percent by weight resinous binder, based upon the total weight of the product

*Example 7*

90 parts by weight fine glass fibers ranging from ¼ to 3 microns in diameter and cut to lengths of about ¼ to 1 inch
10 parts by weight glass wool fibers of the chemical grade cut to about ¼ inch in length
10–25 percent by weight resinous binder, based upon the total weight of the product The procedures for fabrication are substantially similar to that described for Example 1 except that the fibers of small dimension function as the pulp fibers for providing wet strength to the formed sheet and for holding the sheet together until the resinous binder is incorporated.

It is understood that other fibers may be employed within the limitations previously described and that such fibers will be processed as described in Examples 1 and 2 for the manufacture of sheets as by a single sheeting process or by a continuous wet mat process. The resinous binder may be selected of the materials previously described, including the phenol formaldehyde thermosetting resins, the polystyrene resins, butadiene-styrene copolymer resins or the polyacrylate resins. When a thermoplastic resinous binder is employed, as in a latex or solvent solution, in substitution for the phenol formaldehyde resin, application by immersion, flow-coating or imbibing may be employed as with the phenol formaldehyde resins but the resinous materials will be set on the fiber surfaces upon elimination of the diluent. When compressed to the desired shape and density, it is preferred to make use of platens which may be heated and cooled for setting.

A battery separator of the type fabricated in accordance with the composition and procedure set forth in Example 1 will be molded to a thickness of 0.030–0.040 inch with a density of about 10 pounds per 200 square feet which will produce about 1000 sheets dimensioned 5¹³⁄₁₆ x 5¼.

It will be understood that the density of the separator can be varied depending upon the properties desired and the type of materials employed. In general, however, the density will be maintained within the range of 5–15 pounds per 200 square feet of surface and the thickness of the separator may range from 0.015 to about 0.040 inch. For example, a sheet prepared in accordance with Example 1 may be reduced by as much as 50 percent in thickness when glass fibers of small diameter are used instead of the cellulose pulp fibers, without material change in the electrical insulation characteristics.

The critical nature with respect to the amount of cellulose pulp can be illustrated by the following table in which separators were prepared in accordance with the procedure and composition of Example 1 with the exception that the amounts of cellulose fibers were varied from 0–40 percent by weight of the cellulose component.

| Composition, Percent by weight | | Binder | Electrical Resistance,[1] ohms/sq. in. | |
|---|---|---|---|---|
| Glass Fiber | Pulp | | 20 min. at 80° F. | 24 hrs. at 125° F. |
| 90 | 10 | Phenolic | .0238 | .0184 |
| 80 | 20 | Phenolic | .0368 | .0333 |
| 70 | 30 | Phenolic | .0591 | .0557 |
| 60 | 40 | Phenolic | .0925 | .0834 |

[1] Determination made with sulphuric acid 1.225 sp. gr.

It will be apparent from the foregoing that exceptional low values in electrical resistance are secured when the amount of cellulose pulp fibers remains less than 20 percent by weight of the fibrous component. It will be apparent further that the electrical resistance remains favorable even after 24 hours' soak. When the concentration of cellulose pulp fibers exceeds 20 percent by weight, the electrical resistance changes by as much as 100 percent with further increase in electrical resistance as the concentration of cellulose fibers is still further increased. When the cellulose fibers are completely eliminated still lower values are secured. For example, a glass mat prepared in accordance with Example 2 has an electrical resistance value of 0.00612 ohm/sq. in. after a 20 minute soak and a value of 0.00591 ohm/sq. in. after a 24 hour soak.

While ribs can be formed into one of the surfaces of the base sheet 10 forming the separator, it is a further concept of this invention to provide ribs on a previously formed base sheet by bonding a plurality of lengths of rods 12 formed of an acid resistant, oxidation resistant synthetic resinous material in a desired laterally spaced apart relation onto the surface of the base sheet 10. Suitable resinous materials can be selected of polystyrene, butadiene-styrene copolymer, polyacrylate or polyalkylacrylates such as polymethylmethacrylate and the like. Rods of the desired dimension can be cut from lengths formed of such materials for bonding to the surface of the separator. For such purpose, use can be made of a solvent which tackifies either the surface of the separator or the plastic rod or both or else use can be made of a suitable adhesive for bonding the rods onto the surface of the separator. Instead of making use of rods previously formed of the resinous material, the rods may be bonded onto the surface of the separator while the rods are being formed, as by extrusion. Under such conditions, the extruded rods will be sufficiently tacky to bond to the surface of the separator when pressed thereon. While the rods in the illustrated embodiments are round, rods of other shapes may be employed and rods of different dimensions in thickness may be employed, depending upon the size of the separator plate and the size and character of the positive and negative cell plates used therewith.

By way of still further improvement, the single insulation product of Figures 1, 2, 3 and 4 may be formed into a double insulation product with its consequent advantages by further modification to make use of a porous bonded mat 16 of glass fibers as a facing covering the rods 12 bonded to the surface of the separator. It is preferred to make use of a bonded mat of glass fibers of conventional construction wherein a thin layer of glass fibers in unoriented relation is formed into a non-woven mat by the use of a resinous material applied to the fibers and cured. For this purpose, use is made of a thermosetting phenol formaldehyde resin but other binders such as polystyrene, butadiene-styrene copolymer, polymethylmethacrylate and the like may be employed.

Similarly, a bonded mat of glass fibers can be employed to advantage as a facing on the opposite surface of the separator 10 to strengthen the separator, to increase its life and wear resistance, and to provide abrasion resistance which improves the handleability of the separator. The latter facing may be bonded to the surface by the use of a suitable adhesive but it is preferred to form the facing as an initial layer or layers during the fabrication of the separator, as in a wet paper making process.

It will be apparent from the foregoing that we have produced and provided a method for producing a new and improved battery separator which may be formed to smaller dimensions than separators heretofore employed with marked improvements in the characteristics thereof particularly with respect to the electrical resistance at high and low temperature, acid and oxidation resistance especially at high temperature, vibration resistance, increased void volume and high porosity, improved cold rate performances both in minutes and voltage at various low temperatures, high ionic flow and high acid diffusion, rapid acid wetting and high acid sorption as well as improved electrical resistance under normal conditions of use whereby marked improvements are secured as represented by the 5 minute voltage test.

It will be understood that changes may be made in the details of construction and method of fabrication and the materials employed therein, within the limitations defined, without departing from the spirit of the invention, especially as defined in the following claims.

We claim:
1. A battery separator comprising a porous mat of interfelted glass fibers in which the fibers are present in the ratio of 10–25 parts by weight of fine glass fibers of less than 1 micron in diameter and 90–75 parts by weight of glass fibers greater than 5 microns in diameter but less than 16 microns in diameter, and 5–25 percent by weight of a battery acid resistant resinous binder for securing the fibers one to another into a rigid separator.
2. A battery separator as claimed in claim 1 in which the mat has an openness of greater than 50 percent.
3. A battery separator as claimed in claim 1 in which the mat is formed to a thickness of 0.015 to 0.040 inch.
4. A battery separator as claimed in claim 1 in which the mat has a specific gravity from 5–15 pounds per 200 square feet of surface area.
5. A battery separator as claimed in claim 1 which includes facing of a thin porous sheet of bonded glass fibers attached to one wall of the mat.
6. A battery separator as claimed in claim 1 which includes vertically disposed rods of an acid resistant resinous material bonded to an outer surface of the mat in parallel and laterally spaced apart relation to form ribs on the surface thereof.
7. A battery separator as claimed in claim 6 in which the ribs are formed of a polystyrene resin.
8. A battery separator as claimed in claim 6 in which the ribs are formed of a butadiene-styrene resin.
9. A battery separator as claimed in claim 6 in which the ribs are formed of a polyalkylacrylate resin.
10. A battery separator comprising a porous mat of interfelted glass fibers in which the fibers are present in the ratio of 5–25 parts by weight of fine glass fibers of less than 1 micron in diameter and 95–75 parts by weight of glass fibers greater than 5 microns in diameter but less than 16 microns in diameter and 5–25 percent by weight of a battery acid resistant resinous binder for securing the fibers one to another in a rigid separator, vertically disposed rods of an acid resistant resinous material bonded to the surface of the mat in parallel and laterally spaced apart relation to form ribs on the surfaces thereof, and a thin porous facing sheet of bonded glass fibers in spaced parallel relation with the mat and between which the rods of resinous material are sandwiched.

References Cited in the file of this patent
UNITED STATES PATENTS

| | | |
|---|---|---|
| 2,454,100 | Slayter | Nov. 16, 1948 |
| 2,531,504 | Dillehay et al. | Nov. 28, 1950 |
| 2,552,124 | Tallman | May 8, 1951 |
| 2,578,534 | Giles et al. | Dec. 11, 1951 |
| 2,673,887 | Booth | Mar. 30, 1954 |
| 2,687,445 | Merrill | Aug. 24, 1954 |
| 2,687,446 | Merrill | Aug. 24, 1954 |
| 2,734,095 | Mears et al. | Feb. 7, 1956 |